Patented Sept. 28, 1954

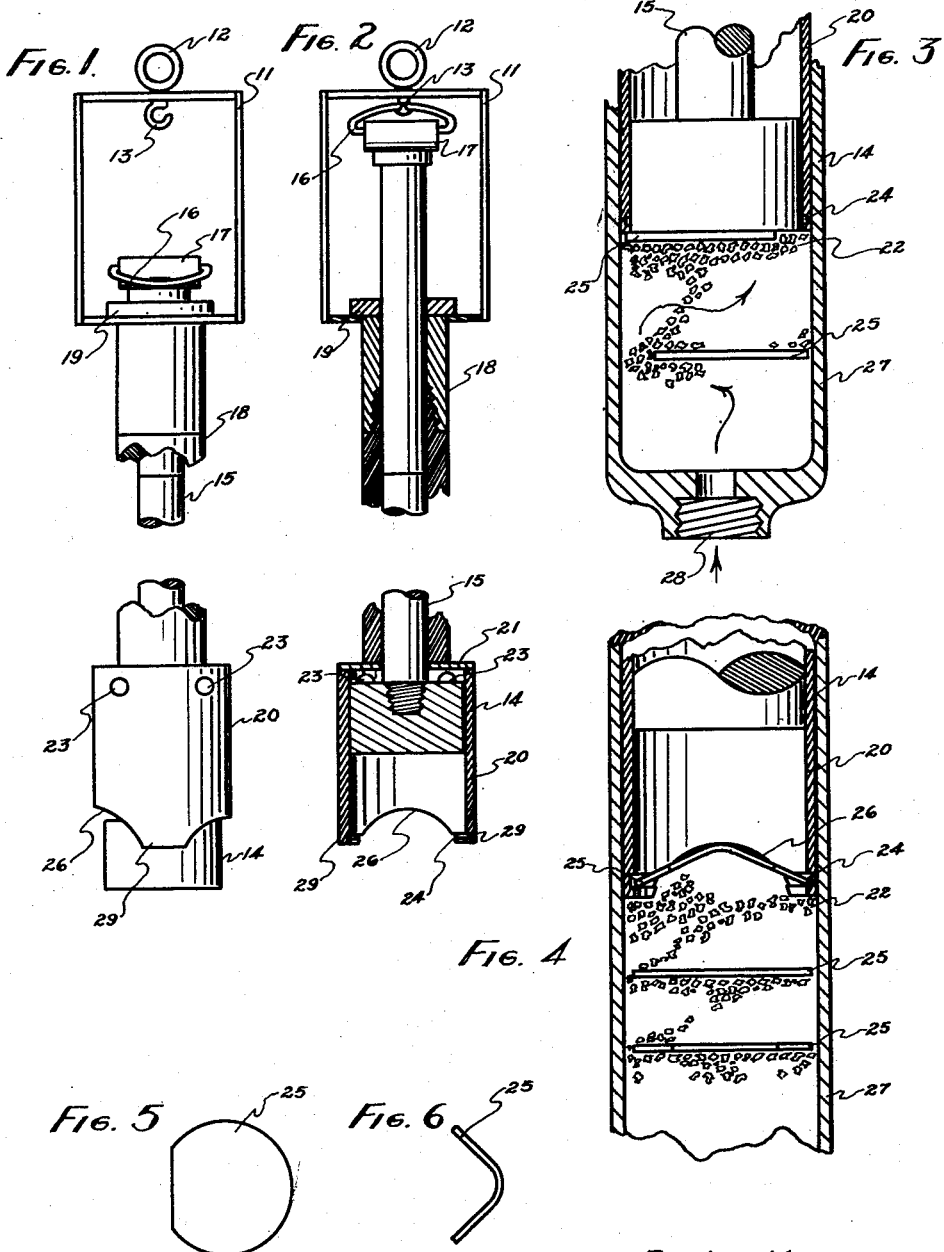

2,690,267

UNITED STATES PATENT OFFICE 2,690,267

CATALYST LOADING AND BAFFLE TOOL

Roy Lee Miller, Canton, and Arthur Harding Parsons, Yazoo City, Miss., assignors to Mississippi Chemical Corporation, Yazoo City, Miss., a corporation of Mississippi Application November 6, 1952, Serial No. 319,112

5 Claims. (Cl. 214—18)

1

The present invention relates to a tool useful in charging convertor tubes in apparatus for conducting catalytic chemical reactions, and is more particularly concerned with a tool for repetitively levelling and tamping measured catalyst portions and positioning a baffle plate thereon.

An object of the invention is to eliminate the inaccuracies involved in the positioning of baffles in convertor tubes and to reduce the time formerly required in the charging of convertor tubes.

Another object is to provide a tool that is capable of simultaneously positioning a baffle, levelling and tamping a measured quantity of catalyst.

Reactions involving the use of catalysts are well known in the chemical industry. A particular catalyst is placed in a convertor tube and the reactant fluids are introduced into the tubes under desirably controlled thermal and pressure conditions.

It has been found that, when the catalyst is placed in the convertor tubes without baffles, a phenomenon known as "channeling" occurs within the tube. As a consequence of the channeling the fluids passing through the convertor tube do not gain the full advantage of the theoretical surface area provided by the finely divided particles of catalyst material. It is found that the channeling can be reduced by the introduction of baffles into the convertor tube when the tube is charged. The baffles are placed in staggered positions along the length of the charged convertor tube, spaced at intervals determined by the successive measures of catalyst. These baffles deflect the flow of the fluid through the convertor tube, causing a wide dispersion of the fluid through the interstices of the catalyst, and making more efficient use of the catalytic surface area available in the charged convertor tube. The baffles are thin metal discs or wafers of a diameter slightly less than the diameter of the convertor tube. A chordal cut characterizes the otherwise round appearance of the baffles. When the baffle is in position in the convertor tube the direct flow of the fluid is blocked. The fluid seeks an escape and is directed around the baffle and by the baffle-formed barrier through the gap left between the convertor tube wall and the chordal cut in the baffle. The next baffle, encountered by the moving fluid, is oppositely oriented in the convertor tube and the obstruction to the movement of the fluid formed by the baffle similarly directs the fluid flow. The baffle positioning continues at regular intervals along

2 the charged convertor tube and the general effect is to produce a zig-zag passage of the fluid through the convertor tube.

Heretofore the charging of a convertor tube has followed a time consuming pattern. An operator standing at the open end of a convertor tube measures and pours a portion of the charge into the convertor tube. Then the operator tamps and levels the catalyst charge aided by a long tamping rod and a flashlight. After each charge of catalyst is tamped and levelled a baffle is dropped into the convertor tube. The operator, aided by a long rod, pokes and prods the baffle into its desired position. The routine is repeated until the convertor tube is fully charged. This method is time consuming and has resulted in poor positioning of the baffles. Even with the most experienced of loading operators the poor positioning of the baffles has resulted in non-uniform production efficiencies.

The present invention of a tool for combining the tamping and leveling operations with the positioning of the baffles has minimized the man hours required for charging convertor tubes. The more uniform positioning of the baffles has resulted in more uniform production efficiency.

These and other features, capabilities, and advantages of the invention will appear from the description which follows and from the accompanying drawings in which:

Figure 1 is a side view of the catalyst loading and baffle tool showing the tamper released.

Figure 2 is a vertical section taken on the centerline of the catalyst loading and baffle tool showing the tamper poised and revealing the internal assembly.

Figure 3 is an enlarged cross-section of the convertor tube showing the catalyst loading and baffle tool in position with the tamper having levelled the charge of catalyst particles, tamped the charge, and having positioned the baffle.

Figure 4 is an enlarged cross-section of the convertor tube showing the catalyst loading and baffle tool in position with the tamper poised and with a baffle in place.

Figure 5 is a plan view of the baffle before deformation.

Figure 6 is an end view of the baffle after deformation and prior to insertion in the tamper barrel.

Referring more specifically to said drawings:

The suspension frame 11 supports the weight of the catalyst loading and baffle tool when it is suspended by a conventional crane or other hoisting mechanism, not shown. Where the terms "top" and "bottom" are used herein, "top" has reference to the end of the catalyst loading and baffle tool having the eye-ring 12 for manipulation by a crane or other hoisting device. The "bottom" referred to herein relates to the end of the catalyst loading and baffle tool which engages the catalyst charge. The eye-ring 12 is attached to the top of the suspension frame 11 to permit easy manipulation of the tool. A hook 13 is located directly beneath the eye-ring 12 inside of the suspension frame 11 and at the center of the top of said suspension frame 11. The hook 13 is for suspending the tamper 14 and the tamper rod 15 by means of engaging the bail 16 which is pivotally attached to a connection 17, such as a pipe T, which connection 17 is in turn fastened to the tamper rod 15. A guide jacket 18 is attached to the bottom center of the suspension frame 11. An aperture in the center bottom of the suspension frame 11 permits the introduction of the guide jacket 18 through the bottom of the suspension frame 11 and a bumper plate or collar 19 is fixed to both the frame 11 and the guide jacket 18. The bumper plate 19 is a metal ring or cylinder which prevents the guide jacket 18 from falling free of the suspension frame 11. The bumper plate 19 also serves as a stop against which the connection 17 will fall and stop if the hook 13 is disengaged from the bail 16 when the catalyst loading and baffle tool has not engaged the catalyst 22. The guide jacket 18 is tubular and permits the movement of the tamper rod 15 vertically but restricts the lateral movement of the tamper rod 15. The guide jacket 18 may be made in sections so that the length of the catalyst loading and baffle tool can be varied by inserting new lengths or subtracting lengths of guide jacket 18 therefrom. In similar manner, the tamper rod 15 can be sectional in equivalent lengths to the guide jacket 18. The insertion of the extra lengths is readily accomplished by the use of conventional connections, a collarless embodiment being indicated in the male and female connections shown in Figure 2. The guide jacket 18 is attached at the bottom to the tamper barrel 20 at the center of the tamper barrel top plate 21. The tamper barrel top plate 21 has a registering hole for the positioning of the guide jacket 18 which registering hole also permits the vertical movement of the tamper rod 15 affecting an annular closure at the top of the tamper barrel 20. Attached to the end of the tamper rod 15 is the tamper 14. The tamper 14 is a solid metal cylinder, preferably made of bronze although any heavy metal cylinder would serve satisfactorily depending upon the nature of the particles of catalyst 22 to be levelled and tamped. The tamper 14 is of such a diameter as to move freely up and down in the tamper barrel 20, the upward travel of the tamper 14 being limited by the annular closure affected by the tamper barrel top plate 21 and its lower travel limited either by the engagement with the catalyst 22 or the engagement of the bumper plate 19 with the connection 17, which ever occurs first when the bail 16 is released from the hook 13. The tamper barrel 20 is closed at its top by the tamper barrel top plate 21 except for the registering hole at the center of the tamper barrel top plate 21 which permits the attachment of the guide jacket 18 and the free passage of the tamper rod 15. The tamper barrel 20 is perforated circumferentially just below the attachment of the tamper barrel top plate 21.

The perforations 23 permit gases to escape from between the tamper 14 and the tamper barrel top plate 21 which speeds up the return movement of the tamper 14 to its poised position as shown in Figure 2.

At the bottom of the tamper barrel 20 semicircular cut-outs 26 truncate the catalyst engaging edge. A shallow annular baffle receiving groove 24 is cut internally into the tamper barrel 20 slightly back from the lips 29 of the tamper barrel 20.

The baffle 25 is preformed as shown in Figure 6 and is arranged so as to be pushed between the lips 29 of the tamper barrel being retained displaceably by the edges of the baffle 25 engaging the annular baffle receiving groove 24.

In operation the catalyst particles 22 are measured into the convertor tube 27 at the top, the measure of the charge settling unevenly to the bottom of the convertor tube 27 and over the inlet 28. A crane or other hoisting mechanism centers the catalyst loading and baffle tool over the open convertor tube 27, the catalyst loading and baffle tool being suspended by the eye-ring 12 in the suspension frame 11. The bail or handle 16 is engaged on the hook 13 as in Figure 2. The operator inserts a metal baffle 25, deformed as in Figure 6, into the open end of the tamper barrel 20, so that its edges engage the annular groove 24. The baffle 25 is snapped into position in the groove 24, access for insertion being provided by the truncations 26 which establish the lips 29, the crane or hoist lowers the assembly as seen in Figure 2 into the convertor tube 27 until the lips 29 of the tamper barrel 20 engage the catalyst 22, the tamper barrel 20 guiding on the inside of the convertor tube 27 as indicated in Figure 4. The operator then disengages the bail or handle 16 from the hook 13 and the weight of the tamper 13 with its attached tamper rod 15 causes the tamper 14 to fall inside of the tamper barrel 20, the tamper 14 being additionally guided by the guide jacket 18 restraining lateral displacement of the tamper rod 15. When the tamper 14 falls it strikes the baffle 25 which the operator has previously sprung into place in the annular groove 24. The baffle 25 is thereby disengaged from the annular groove 24 and is positioned by the tamper 14. Simultaneously the tamper 14 levels and tamps the catalyst particles 22 inside the convertor tube 27. The tamper 14 is lifted by means of the bail or handle 16, attached to the tamper rod 15, and secured in its poised position, shown in Figure 2, by engaging the bail or handle 16 with the hook 13. The catalyst loading and baffle tool is removed from the convertor tube 27 and the operation of measuring and pouring the catalyst 22 is repeated.

When the operator displaceably inserts the next baffle 25 into the annular grooves 24 of the tamper barrel 20, he rotates the catalyst loading and baffle tool 180 degrees.

The catalyst loading and baffle tool is run into the convertor tube 27. The bail 16 is disengaged from the hook 13 and the tamper 14 falls disengaging the displaceably positioned baffle 25, and levelling and tamping the catalyst charge 22. The baffle 25 is now firmly positioned oppositely to the previously inserted baffle 25, and the operations are repeated until the catalyst 22 and the alternatively positioned baffles 25 fill the converter tube 27.

The invention has been described as showing a commercial embodiment thereof. There has been no attempt to show any further adaptations thereof and it is believed that this disclosure will enable those skilled in the art to adapt the invention as may be desired.

We claim:

1. In a tool for charging chemical reactor convertor tubes, the combination of: a tamper barrel having a smaller outside diameter than the inside diameter of said converter tubes into which said tamper barrel is lowered and having an open end provided with means for receiving and displaceably retaining a baffle and having at the other end an annular closure; a slidable tamper in said tamper barrel adapted to displace a baffle from said retaining means; a tamper rod attached to said tamper; and, a guide jacket attached to said annular closure, said guide jacket encasing said tamper rod slidably.

2. In a tool for charging chemical reactor convertor tubes, the combination of: a tamper barrel having an open end provided with an annular groove for receiving and displaceably retaining a baffle and having at the other end an annular closure; a slidable tamper in said tamper barrel and adapted to displace a baffle from said groove; a tamper rod attached to said tamper; and, a guide jacket attached to said annular closure, said guide jacket encasing said tamper rod slidably.

3. In a tool for charging chemical reactor convertor tubes, the combination of: a tamper barrel having an open end provided with an annular groove for holding a deformed baffle; a slidable tamper in said tamper barrel; a rod attached to said tamper at one end and provided with a bail pivotally attached at its other end; a guide jacket for said rod; a suspension frame to which said guide jacket is attached; a hook depending from the top of said suspension frame for releasably engaging said tamper rod bail at its upper end.

4. A tool for charging chemical reactor convertor tubes substantially as in claim 3, said guide jacket being made in sections; said tamper rod also being made in sections corresponding in length to the sections of the guide jacket.

5. In a method of loading a converter tube with a plurality of predetermined amounts of uniformly packed catalyst spaced apart by baffles, the steps which include: introducing a predetermined amount of catalyst into said tube; then placing in said tube a tool displaceably carrying a baffle and provided with a releasably held tamper adapted to disengage said baffle from the tool and to level and tamp the aforesaid portion of catalyst; releasing said tamper, disengaging said baffle from said tool; withdrawing said tool from the said convertor tube; rotating said tool 180 degrees; and repeating the same sequence of operations until said convertor tube has been filled to the desired point.

References Cited in the file of this patent

UNITED STATES PATENTS

| Number | Name | Date |
|--------|------|------|
| 864,226 | Blodgett | Aug. 27, 1907 |